United States Patent
Nukaga

(10) Patent No.: US 8,222,337 B2
(45) Date of Patent: Jul. 17, 2012

(54) RUBBER COMPOSITION AND TIRE USING THE SAME

(75) Inventor: Hideyuki Nukaga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/996,964

(22) PCT Filed: Jun. 11, 2009

(86) PCT No.: PCT/JP2009/060712
§ 371 (c)(1),
(2), (4) Date: Dec. 8, 2010

(87) PCT Pub. No.: WO2009/151103
PCT Pub. Date: Dec. 17, 2009

(65) Prior Publication Data
US 2011/0092633 A1    Apr. 21, 2011

(30) Foreign Application Priority Data
Jun. 11, 2008   (JP) .................... 2008-153110

(51) Int. Cl.
*C08L 53/00* (2006.01)

(52) U.S. Cl. ......................... 524/505; 525/99

(58) Field of Classification Search .................. 524/505; 525/99
See application file for complete search history.

(56) References Cited

U.S. PATENT DOCUMENTS

| | | | |
|---|---|---|---|
| 4,908,401 A | 3/1990 | Ohara et al. | |
| 5,679,744 A | 10/1997 | Kawauzra et al. | |
| 6,025,430 A | 2/2000 | Blok et al. | |

FOREIGN PATENT DOCUMENTS

| | | |
|---|---|---|
| JP | 08-283465 A | 10/1996 |
| JP | 11-029660 A | 2/1999 |
| JP | 2002-012702 A | 1/2002 |
| JP | 2002-256108 A | 9/2002 |
| JP | 2004168824 A | 5/2004 |
| JP | 2005-133017 A | 5/2005 |
| JP | 2007-191611 A | 8/2007 |
| WO | WO 2007083765 A1 | 7/2007 |
| WO | WO 2008004675 A1 | 1/2008 |

OTHER PUBLICATIONS

Supplemental European Search Report corresponding to EP 09762533, dated Oct. 4, 2011.
Chinese Office Action corresponding to Chinese Patent Application No. 200980129322.3 dated May 9, 2012.

*Primary Examiner* — Peter Szekely
(74) *Attorney, Agent, or Firm* — Sughrue Mion, PLLC

(57) ABSTRACT

This invention relates to a rubber composition capable of improving fracture properties and wear resistance of a tire, and more particularly to a rubber composition formed by compounding a non-compatible polymer blend, which comprises at least two rubber components and forms a polymer phase A and a polymer phase B, with a block copolymer comprising a block-a composed of the same monomer unit as a monomer unit forming the polymer phase A and a block-b composed of the same monomer unit as a monomer unit forming the polymer phase B, wherein at least one of the rubber components has at least one functional group.

8 Claims, No Drawings

RUBBER COMPOSITION AND TIRE USING THE SAME

CROSS REFERENCE TO RELATED APPLICATIONS

This application is a National Stage of International Application No. PCT/JP2009/060712, filed on Jun. 11, 2009, which claims priority from Japanese Patent Application No. 2008-153110, filed on Jun. 11, 2008, the contents of all of which are incorporated herein by reference in their entirety.

TECHNICAL FIELD

This invention relates to a rubber composition and a tire using the rubber composition, and more particularly to a rubber composition capable of improving fracture properties and wear resistance of a tire.

RELATED ART

Recently, demands on low fuel consumption, safety and so on of automobiles become more severer, and hence it is strongly desired to use a rubber composition having not only wear resistance and fracture properties required since early times but also excellent other performances such as gripping performance and the like as a rubber material for a tire tread of the automobile. As a technique for improving various performances of the rubber composition, it is commonly conducted by using a blend of rubber components (polymers) having different properties or to add various additives. In this case, however, a phase-separating boundary is existent in the rubber composition, and it is considered that such a boundary badly affects fracture properties such as tensile strength (Tb), elongation at break (Eb) and the like as well as wear resistance and so on as an origin of the fracture.

The phase-separating boundary existing in the rubber composition for the tire tread can be mainly divided into a boundary between filler and polymer and a boundary between polymers. JP-A-H11-29660 (Patent Document 1) discloses that a block copolymer having plural blocks, in which each of the blocks is compatible with different polymer phase, is compounded with a non-compatible polymer blend having a phase-separating boundary between polymers, whereby an interfacial affinity between polymers can be increased to improve the fracture properties, wear resistance and so on.

PRIOR ART DOCUMENT

Patent Document

Patent Document 1: JP-A-H11-29660

SUMMARY OF THE INVENTION

Task to be Solved by the Invention

However, as a result of the inventor's examinations, it has been found that strain during the rubber deformation is easily concentrated in the boundary between filler and polymer existing in the rubber composition as compared with the boundary between polymers and hence the boundary between filler and polymer is easy to be an origin of the fracture. For this end, the influence by the boundary between polymers is small as compared with that by the boundary between filler and polymer, so that it is not led to effectively utilize the effect of improving the interfacial affinity between polymers.

It is, therefore, an object of the invention to provide a rubber composition capable of improving fracture properties and wear resistance of tires by suppressing strain concentrated in the boundary between filler and polymer to effectively develop the effect of improving the interfacial affinity between polymers. Also, it is another object of the invention to provide a tire having excellent fracture properties and wear resistance by using such a rubber composition in a tread portion thereof.

Means for Solving Task

The inventor has made various studies in order to achieve the above objects, and found that a non-compatible polymer blend forming a polymer phase A and a polymer phase B is compounded with a block copolymer comprising a block-a compatible with the polymer phase A but not compatible with the polymer phase B and a block-b compatible with the polymer phase B but not compatible with the polymer phase A and further at least one functional group is introduced into at least one of rubber components constituting the non-compatible polymer blend, whereby the fracture properties and wear resistance can be improved, and as a result, the invention has been accomplished.

That is, the rubber composition according to the invention is formed by compounding a non-compatible polymer blend, which comprises at least two rubber components and forms a polymer phase A and a polymer phase B, with a block copolymer comprising a block-a composed of the same monomer unit as a monomer unit forming the polymer phase A and a block-b composed of the same monomer unit as a monomer unit forming the polymer phase B, wherein at least one of the rubber components has at least one functional group.

The non-compatibility between polymer phase A and polymer phase B in the non-compatible polymer blend, non-compatibility between block-a and block-b in the block copolymer and non-compatibility between polymer phase A or polymer phase B in the non-compatible polymer blend and block-a or block-b in the block copolymer are evaluated by shaping a rubber composition of a combination to be targeted into a sheet with test rolls, subjecting the sheet to press vulcanization at 150° C. for 30 minutes with a test mold of 15 cm×15 cm×1 cm to prepare a vulcanized sheet, cutting the vulcanized sheet into an ultra-this piece with a microtome, and then observing it with a scanning type probe microscope. If a phase-separating structure is confirmed, the polymer phase and/or the block is non-compatible. Moreover, the judgment of the compatibility or non-compatibility may be conducted by using a method of judging whether or not a peak in a temperature dispersion curve is bimodal or a method of judging whether or not plural glass transition temperatures of the polymer blend are observed by DSC measurement. When the phase-separating structure comes to several tem microns, an optical microscope may be used.

In a preferable embodiment of the rubber composition of the invention, at least one of the polymer phase A and the polymer phase B comprises natural rubber and/or polyisoprene rubber, and the other polymer phase comprises a synthetic rubber other than polyisoprene rubber. In this case, the synthetic rubber other than polyisoprene rubber is preferably polybutadiene rubber.

In the rubber composition of the invention, it is preferable that a weight average molecular weight of the rubber component is not less than 200000 and a weight average molecular weight of each of the block-a and the block-b constituting the block copolymer is 50000 to 500000. The term "weight average molecular weight" used herein means a vale converted to polystyrene as measured by a gel permeation chromatography (GPC).

In the rubber composition of the invention, the amount of the block copolymer compounded is preferable to be 0.3-20 parts by mass per 100 parts by mass in total of the rubber components.

In another preferable embodiment of the rubber composition of the invention, a filler is further included in an amount of 10-100 parts by mass per 100 parts by mass in total of the rubber components.

Also, the tire according to the invention is characterized by using the above rubber composition in any one of tire members. In this case, the tire member is preferable to be a tread portion, a sidewall portion, a side-reinforcing rubber, a bead portion or a rubber chafer.

Effect of the Invention

According to the invention, there can be provided a rubber composition capable of improving fracture properties and wear resistance of tires by compounding a non-compatible polymer blend forming polymer phase A and polymer phase B with a block copolymer comprising a block-a compatible with the polymer phase A but not compatible with the polymer phase B and a block-b compatible with the polymer phase B but not compatible with the polymer phase A and further introducing at least one functional group into at least one of the rubber components constituting the non-compatible polymer blend. Also, there can be provided a tire having excellent fracture properties and wear resistance by using such a rubber composition in a tread portion.

BEST MODE FOR CARRYING OUT THE INVENTION

The invention will be described in detail below. The rubber composition according to the invention is formed by compounding a non-compatible polymer blend, which comprises at least two rubber components and forms a polymer phase A and a polymer phase B, with a block copolymer comprising a block-a composed of the same monomer unit as a monomer unit forming the polymer phase A and a block-b composed of the same monomer unit as a monomer unit forming the polymer phase B, characterized in that at least one of the rubber components has at least one functional group.

By using a rubber component (modified polymer), which is formed by introducing at least one functional group into at least one of the rubber components constituting the non-compatible polymer blend, is increased a reinforcing effect between filler and polymer widely known as a bound rubber and further stress or strain concentrated in the boundary between filler and polymer is suppressed to effectively develop the effect of improving interfacial affinity between polymers caused by compounding the block copolymer into the non-compatible polymer blend, and as result, the fracture properties and wear resistance of tires can be improved highly.

The non-compatible polymer blend in the rubber composition of the invention comprises at least two rubber components and forms a polymer phase A and a polymer phase B, in which the polymer phase A and the polymer phase B are non-compatible. As the rubber component are concretely mentioned polyisoprene rubber (IR), styrene-butadiene copolymer rubber (SBR), polybutadiene rubber (BR), ethylene-propylene-diene rubber (EPDM), chloroprene rubber (CR), isobutylene-isoprene rubber (IIR), halogenated butyl rubber, acrylonitrile-butadiene rubber (NBR) and so on. Moreover, as the rubber component may be used either an unmodified polymer or a modified polymer, but at least one of the rubber components constituting the polymer phase A and the polymer phase B is required to have at least one functional group (i.e. modified polymer). As the functional group is preferable a functional group having an affinity with a filler such as carbon black, silica or the like, and a tin-containing functional group, a silicon-containing functional group and a nitrogen-containing functional group are further preferable. By using the rubber component involved with at least one functional group is enhanced the affinity of the rubber component with the filler to reinforce an interface between filler and polymer, whereby strain concentrated in the interface between filler and polymer can be suppressed. Moreover, a ratio of the rubber component having at least one functional group in the non-compatible polymer blend is preferable to be not less than 20 mass % from a viewpoint of reinforcing the interface between filler and polymer.

In order to form the non-compatible polymer blend in the rubber composition according to the invention, it is preferable that one of the polymer phase A and the polymer phase B comprises natural rubber and/or polyisoprene rubber and the other polymer phase comprises a synthetic rubber other than polyisoprene rubber. That is, by using natural rubber and/or polyisoprene rubber and the synthetic rubber other than polyisoprene rubber as a rubber component in the rubber composition according to the invention can be easily formed the non-compatible polymer blend. As the synthetic rubber other than polyisoprene rubber is preferable polybutadiene rubber. On the other hand, from a viewpoint of improving the wear resistance, SBR/BR or SBR/NR is mentioned as a combination of rubber components constituting the polymer phase A and polymer phase B for the formation of the non-compatible polymer blend.

In the rubber composition according to the invention, it is necessary to introduce at least one functional group into at least one of the rubber components constituting the non-compatible polymer blend. However, the modified polymer is large in the effect of reinforcing the interface between filler and polymer and contributes to highly improve fracture properties of the interface existing in the non-compatible polymer blend, so that the object of the invention can be achieved by using any of the aforementioned rubber components as the modified polymer.

In the invention, if natural rubber is used as a modified polymer, the production method of modified natural rubber is nit particularly limited, but includes, for example, a method wherein a polar group-containing monomer is added to natural rubber latex to graft-polymerize the polar group-containing monomer to natural rubber molecule of the natural rubber latex and further coagulation and drying are conducted.

The natural rubber latex used in the production of the modified natural rubber is not particularly limited, and may include, for example, field latex, ammonia-treated latex, centrifuged latex, deproteinized latex treated with a surfactant or an enzyme and a combination thereof.

The polar group-containing monomer to be added to the natural rubber latex is not particularly limited as long as it has at least one polar group in its molecule and can be graft-polymerized with the natural rubber molecule. At this moment, the polar group-containing monomer is preferable to have carbon-carbon double bond in its molecule for graft-polymerizing with the natural rubber molecule, and a polar group-containing vinyl monomer is preferable. As the polar group may be preferably mentioned amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group, alkoxysilyl group and so on. These polar group-containing monomers may be used alone or in a combination of two or more.

As the amino group-containing monomer is mentioned a polymeric monomer containing in its molecule at least one amino group selected from the group consisting of primary, secondary and tertiary amino groups. Among the amino group-containing polymeric monomers, tertiary amino group-containing monomers such as dialkylaminoalkyl (metha)acrylate and the like are particularly preferable. These amino group-containing monomers may be used alone or in a combination of two or more.

As the primary amino group-containing monomer are mentioned acrylamide, methacrylamide, 4-vinylaniline, amino(methyl(metha)acrylate, aminoethyl(metha)acrylate, aminopropyl(metha)acrylate, aminobutyl(metha)acrylate and so on.

As the secondary amino group-containing monomer are mentioned (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene, α-carboxy-β-carboxy-β-phenyl-p-anilinostyrene and the like; (2) anilinophenyl butadienes such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and the like; and (3) N-monosubstituted (metha)acrylamides such as N-methyl(metha)acrylamide, N-ethyl(metha)acrylamide, N-methylolacrylamide, N-(4-anilinophenyl)methacrylamide, and the like.

As the tertiary amino group-containing monomer are mentioned N,N-disubstituted aminoalkyl(metha)acrylate, N,N-disubstituted aminoalkyl(metha)acrylamide and so on. As the N,N-disubstituted aminoalkyl(metha)acrylate are preferably mentioned N,N-dimethylaminoethyl(metha)acrylate, N,N-diethylaminoethyl(metha)acrylate, N,N-dipropylaminoethyl (metha)acrylate, N,N-dioctylaminoethyl(metha)acrylate, N-methyl-N-ethylaminoethyl(metha)acrylate and the like. As the N,N-disubstituted aminoalkyl(metha)acrylamide are preferably mentioned N,N-dimethylaminopropyl(metha) acrylamide, N,N-diethylaminopropyl(metha)acrylamide, N,N-dioctylaminopropyl(metha)acrylamide and the like.

As the nitrile group-containing monomer are mentioned (metha)acrylonitrile, cyanated vinylidene and so on. These nitrile group-containing monomers may be used alone or in a combination of two or more.

As the hydroxyl group-containing monomer are mentioned polymeric monomers each having in its molecule at least one of primary, secondary and tertiary hydroxy groups. Such a monomer includes hydroxyl group-containing unsaturated carboxylic monomers, hydroxyl group-containing vinyl ether monomers, hydroxyl group-containing vinyl ketone monomers and so on. As a concrete example of the hydroxyl group-containing monomers are mentioned hydroxyalkyl(metha) acrylates such as 2-hydroxyethyl(metha)acrylate, 2-hydroxypropyl(metha)acrylate, 3-hydroxypropyl(metha) acrylate, 2-hydroxybutyl(metha)acrylate, 3-hydroxybutyl (metha)acrylate, 4-hydroxybutyl(metha)acrylate and the like; mono(metha)acrylates of polyalkylene glycol (number of alkylene glycol units is, for example, 2-23) such as polyethylene glycol, polypropylene glycol and the like; hydroxyl group-containing unsaturated amides such as N-hydroxymethyl(metha)acrylamide, N-(2-hydroxyethyl)(metha)acrylamide, N,N-bis(2-hydroxyethyl)(metha)acrylamide and the like; and hydroxyl group-containing vinyl aromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like. Among them, the hydroxyl group-containing unsaturated carboxylic monomers, hydroxyalkyl (metha)acrylates and hydroxyl group-containing vinyl aromatic compounds are preferable, and particularly the hydroxyl group-containing unsaturated carboxylic monomers are preferable. As the hydroxyl group-containing unsaturated carboxylic monomer are mentioned ester, amide, anhydride derivatives of acrylic acid, methacrylic acid, itaconic acid, fumaric acid, maleic acid and so on. Among them, esters of acrylic acid and methacrylic acid are particularly preferable. These hydroxyl group-containing monomers may be used alone or in a combination of two or more.

As the carboxyl group-containing monomer are mentioned unsaturated carboxylic acids such as (metha)acrylic acid, maleic acid, fumaric acid, itaconic acid, tetraconic acid, cinnamic acid and the like; free carboxyl group-containing esters such as monoesters between non-polymeric polyvalent carboxylic acid such as phthalic acid, succinic acid, adipic acid or the like and hydroxy group-containing unsaturated compound such as (metha)allyl alcohol, 2-hydroxyethyl(metha) acrylate or the like, and salts thereof. Among them, the unsaturated acids are particularly preferable. These carboxyl group-containing monomers may be used alone or in a combination of two or more.

As the epoxy group-containing monomer are mentioned (metha)allylglycidyl ether, glycidyl(metha)acrylate, 3,4-oxycyclohexyl(metha)acrylate and so on. These epoxy group-containing monomers may be used alone or in a combination of two or more.

A nitrogen-containing heterocyclic ring in the nitrogen-containing heterocyclic group-containing monomers includes pyrrole, histidine, imidazole, triazolydine, triazole, triazine, pyridine, pyrimidine, pyrazine, indole, quinoline, purine, phenazine, pteridine, melamine and so on. Moreover, the nitrogen-containing heterocyclic ring may be included in a ring containing another heteroatom. As a monomer containing pyridyl group as a nitrogen-containing heterocyclic group are mentioned pyridyl group-containing vinyl compounds such as 2-vinylpyridine, 3-vinylpyridine, 4-vinylpyridine, 5-methyl-2-vinylpyridine, 5-ethyl-2-vinylpyridine and the like. Among them, 2-vinylpyridine and 4-vinylpyridine are particularly preferable. These nitrogen-containing heterocyclic group-containing monomers may be used alone or in a combination of two or more.

As the alkoxysilyl group-containing monomer are mentioned (metha)acryloxymethyl trimethoxysilane, (metha) acryloxymethyl dimethoxysilane, (metha)acryloxymethyl diemtylmethoxysilane, (metha)acryloxymethyl triethoxysilane, (metha)acryloxymethylmethyl diethoxysilane, (metha) acryloxymethyl dimethylethoxysilane, (metha)acryloxymethyl tripropoxysilane, (metha)acryloxymethylmethyl dipropoxysilane, (metha)acryloxymethyldimethyl propoxysilane, γ-(metha)acryloxypropyl trimethoxysilane, γ-(metha)acryloxypropylmethyl dimethoxysilane, γ-(metha) acryloxypropyldimethyl methoxysilane, γ-(metha)acryloxypropyl triethoxysilane, γ-(metha)acryloxypropylmethyl diethoxysilane, γ-(metha)acryloxypropyldimethyl ethoxysilane, γ-(metha)acryloxypropyl tripropoxysilane, γ-(metha)acryloxypropylmethyl dipropoxysilane, γ-(metha)acryloxypropyldimethyl propoxysilane, γ-(metha)acryloxypropylmethyl diphenoxysilane, γ-(metha)acryloxypropyldimethyl phenoxysilane, γ-(metha)acryloxypropylmethyl dibenzyloxysilane, γ-(metha)acryloxypropyldimethyl benzyloxysilane, trimethoxy vinylsilane, triethoxy vinylsilane, 6-trimethoxysilyl-1,2-hexene, p-trimethoxysilyl styrene and so on. These alkoxysilyl group-containing monomers may be used alone or in a combination of two or more.

When the aforementioned polar group-containing monomer is graft-polymerized to natural rubber molecule of the natural rubber latex, the graft polymerization of the polar group-containing monomer to the natural rubber molecule is carried out by emulsion polymerization. In this emulsion polymerization, it is preferable that the polar group-containing monomer is typically added together with an initiator to a solution containing natural rubber latex, water and, if necessary, an emulsifying agent and stirred at a given temperature to polymerize the polar group-containing monomer. Moreover, when the polar group-containing monomer is added to the natural rubber latex, the emulsifying agent may be previously added to the natural rubber latex, or the polar group-containing monomer may be emulsified with the emulsifying agent before the addition to the natural rubber latex. The emulsifying agent usable in the emulsification of the natural rubber latex and/or the polar group-containing monomer is not particularly limited and includes a nonionic surfactant such as polyoxyethylene lauryl ether or the like, and so on.

The initiator is not particularly limited, so that various initiators for emulsion polymerization may be used. Also, the addition method is not particularly limited. As an example of the initiator usually used are mentioned benzoyl peroxide, hydrogen peroxide, cumen hydroperoxide, tert-butyl hydroperoxide, di-tert-butyl peroxide, 2,2-azobisisobutylonitrile, 2,2-azobis(2-diaminopropane)hydrochloride, 2,2-azobis(2-diaminopropane)dihydrochloride, 2,2-azobis(2,4-dimethylvaleronitrile), potassium persulfate, sodium persulfate, ammonium persulfate and so on. Moreover, it is preferable to use a redox initiator for lowering the polymerization temperature. In such a redox initiator, as a reducing agent to be combined with the peroxide are mentioned, for example, tetraethylene pentamine, mercaptans, acidic sodium sulphite, reducing metal ion, ascorbic acid and so on. As a preferable combination of peroxide and reducing agent in the redox initiator is mentioned a combination of tert-butyl hydroperoxide and tetraethylene pentamine, and the like.

In order to improve the low loss factor and wear resistance by compounding the modified natural rubber with a filler without deteriorating the processability of the rubber composition, it is important that a small amount of the polar group-containing monomer is uniformly introduced into each natural rubber molecule, so that the amount of the initiator added is preferably within a range of 1-100 mol %, more preferably 10-100 mol % per the polar group-containing monomer.

The aforementioned components are charged into a reaction vessel and reacted at 30-80° C. for 10 minutes to 7 hours to obtain a modified natural rubber latex having natural rubber molecule graft-polymerized with the polar group-containing monomer. Also, the modified natural rubber latex is coagulated, washed and dried with a drying machine such as vacuum drier, air drier, drum drier or the like to obtain a modified natural rubber. The coagulating agent used in the coagulation of the modified natural rubber latex is not particularly limited and includes an acid such as formic acid, sulfuric acid or the like, and a salt such as sodium chloride or the like.

In the modified natural rubber latex and the modified natural rubber, the amount of the polar group-containing monomer to be grafted is preferably within a range of 0.01-5.0 mass %, more preferably 0.01-1.0 mass % per the rubber component in the natural rubber latex. When the amount of the polar group-containing monomer to be grafted is less than 0.01 mass %, the low loss factor and rear resistance of the rubber composition may not be improved sufficiently. While, when the amount of the polar group-containing monomer to be grafted exceeds 5 mass %, physical properties inherent to natural rubber such as viscoelasticity, S-S characteristic (stress-strain curve in a tensile testing machine) and the like are largely changed, and hence there is a fear that the excellent physical properties inherent to natural rubber are damaged but also the processability of the rubber composition is highly deteriorated.

In the invention, if synthetic rubber is used as a modified polymer, such a modified synthetic rubber is not particularly limited and is preferable to be conjugated diene-based polymers, i.e. homopolymer of a conjugated diene compound and a copolymer of an aromatic vinyl compound and a conjugated diene compound. In this case, it can be obtained by (1) a method wherein a conjugated diene compound alone as a monomer or a mixture of an aromatic vinyl compound and a conjugated diene compound as a monomer is polymerized with an initiator to produce a polymer having a polymerization active site and then the polymerization active site is modified with various modifying agents, or (2) a method wherein the monomer is polymerized with an initiator having a functional group. At this moment, the conjugated diene-based polymer having a polymerization active site may be produced by an anion polymerization or a coordinate polymerization.

Moreover, the conjugated diene compound as a monomer includes 1,3-butadiene, isoprene, 1,3-pentadiene, 2,3-dimethyl butadiene, 2-phenyl-1,3-butadiene, 1,3-hexadiene and the like. Among them, 1,3-butadiene and isoprene are preferable. On the other hand, the aromatic vinyl compound as a monomer includes styrene, p-methylstyrene, m-methylstyrene, p-tert-butylstyrene, α-methylstyrene, chloromethylstyrene, vinyl toluene and the like.

In case of producing the modified synthetic rubber by an anion polymerization, a lithium compound is preferable as an initiator, and hydrocarbyllithium and a lithium amide compound are further preferable. When hydrocarbyllithium is used as an initiator, a polymer having a hydrocarbyl group at a polymerization start terminal and a polymerization active site at the other terminal is obtained. On the other hand, when the lithium amide compound is used as an initiator, a polymer having a nitrogen-containing functional group at a polymerization start terminal and a polymerization active site as the other terminal is obtained, which can be used as a modified synthetic rubber without further modifying with a modifying agent. Moreover, the amount of the initiator used is preferable to be a range of 0.2-20 mmol per 100 g of the monomer.

As the lithium amide compound are mentioned lithium hexamethylene imide, lithium pyrrolidide, lithium piperidide, lithium heptamethylene imide, lithium dodecamethylene imide, lithim dimethylamide, lithium diethylamide, lithium dipropylamide, lithium dibutylamide, lithium dihexylamide, lithium diheptylamide, lithium dioctylamide, lithium-2-ethylhexylamide, lithium didecylamide, lithium-N-methylpiperazide, lithium ethylpropylamide, lithium ethylbutylamide, lithium methylbutylamide, lithium ethylbenzylamide, lithium methylphenetylamide and so on. Among them, a cyclic lithium amide compounds such as lithium hexamethylene imide, lithium pyrrolidide, lithium piperidide, lithium heptamethylene imide, lithium dodecamethylene imide are preferable, and lithium hexamethylene imide and lithium pyrrolidide are particularly preferable.

As a method of producing a modified synthetic rubber with the above initiator, for example, the monomer can be polymerized in a hydrocarbon solvent inactive to polymerization reaction to produce a modified synthetic rubber. As the hydrocarbon solvent inactive to polymerization reaction are mentioned propane, n-butane, isobutane, n-pentane, isopentane, n-hexane, cyclohexane, propene, 1-butene, isobutene, trans-2-butene, cis-2-butene, 1-pentene, 2-peneten, 1-hexene, 2-hexene, benzene, toluene, xylene, ethylbenzene, methylcylopentane, methylcyclohexane and so on. These solvents may be used alone or in a combination of two or more.

The anion polymerization may be carried out in the presence of a randomizer. The randomizer can control the microstructure in the conjugated diene compound portion of the polymer. More concretely, it has an action of controlling the content of vinyl bond in the conjugated diene compound portion of the polymer or randomizing the conjugated diene compound unit and the aromatic vinyl compound unit in the polymer. As the randomizer are mentioned dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylene diamine, 1,2-dipiperidinoethane, potassium-t-amylate, potassium-t-butoxide, sodium-t-amylate and so on. The amount of the randomizer used is preferably a range of 0.01-100 mol equivalent per 1 mol of the initiator. Also, the mixture may be used.

The anion polymerization is preferable to be carried out by solution polymerization. The concentration of the monomer in the polymerization reaction solution is preferably a range of 5-50 mass %, more preferably a range of 10-30 mass %. When the conjugated diene compound and the aromatic vinyl compound are used together, the content of the aromatic vinyl compound in the monomer mixture can be properly selected in accordance with the aromatic vinyl compound quantity in the target copolymer. Also, the polymerization system is not particularly limited, and may be batch or continuous.

The polymerization temperature in the anion polymerization is preferably a range of 0-150° C., more preferably a range of 20-130° C. Also, the polymerization may be carried out under a generated pressure, but is preferable to be typically conducted under a pressure enough to substantially keep the monomer used at a liquid phase. If the polymerization reaction is carried out under a pressure higher than the generated pressure, it is preferable to pressurize the reaction system with an inert gas. Also, starting materials to be used in the polymerization such as monomers, initiator, solvent and the like are preferable to be used by previously removing reaction inhibiting substances such as water, oxygen, carbon dioxide, protonic compound and the like.

On the other hand, when the modified synthetic rubber is produced by coordinate polymerization, it is preferable to use a rare earth metal compound as the initiator and it is further preferable to use the following (a)-component, (b)-component and (c)-component in combination. By such a coordinate polymerization is obtained a conjugated diene-based polymer having a polymerization active site.

The (a)-component used in the coordinate polymerization is selected from rare earth metal compounds, complex compounds between rare earth metal compound and Lewis base, and so on. Here, the rare earth metal compound includes carboxylates, alkoxides, β-diketone complexes, phosphates, phosphites and the like of rare earth elements, and the Lewis base includes acetylacetone, tetrahydrofuran, pyridine, N,N-dimethylformamide, thiophene, diphenyl ether, triethylamine, organic phosphorus compounds, monovalent or bivalent alcohols and so on. As the rare earth element in the rare earth metal compounds are preferable lanthanum, neodymium, praseodymium, samarium and gadolinium, and among them, neodymium is particularly preferable. As the (a)-component are concretely mentioned neodymium tri-2-ethylhexanoate and a complex compound thereof with acetylacetone, neodymium trineodecanoate and a complex compound thereof with acetylacetone, neodymium tri-n-butoxide and so on. These (a)-components may be used alone or in a combination of two or more.

The (b)-component used in the coordinate polymerization is selected from organoaluminum compounds. As the organoaluminum compound are concretely mentioned a trihydrocarbyl luminum compound represented by a formula of $R_3Al$, a hydrocarbyl aluminum hydride represented by formula of $R_2AlH$ or $RAlH_2$ (wherein R is independently a hydrocarbon group having a carbon number of 1-30), a hydrocarbyl aluminoxane compound having a carbon number of 1-30, and so on. concretely, the organoaluminum compound includes trialkylaluminum, dialkylaluminum hydride, alkylaluminum dihydride, alukylaluminoxane and the like. These compounds may be used alone or in a combination of two or more. Moreover, as the (b)-component, it is preferable to use aluminoxane and another oraganoaluminum compound together.

The (c)-component used in the coordinate polymerization is selected from a compound having a hydrolyzable halogen or a complex compound thereof with Lewis base; an organic halogen compound having a tertiary alkyl halide, benzyl halide or allyl halide; an ionic compound consisting of a non-coordinate anion and a counter ion thereof, and the like. Concretely, the (c)-component includes alkylaluminum dichloride, dialkylaluminum chloride, silicon tetrachloride, tin tetrachloride, a complex of zinc chloride and a Lewis base such as alcohol or the like, a complex of magnesium chloride and a Lewis base such as alcohol or the like, benzyl chloride, t-butyl chloride, benzyl bromide, t-butyl bromide, triphenylcarbonium tetrakis(pentafluorophenyl) borate and so on. These (c)-components may be used alone or in a combination of two or more.

The initiator may be preliminarily prepared by using the same conjugated diene compound and/or aromatic vinyl compound as the monomer for polymerization, if necessary, in addition to the above (a), (b) and (c)-components. Alternatively, a part of a whole of the (a)-component or the (c)-component may be carried on an inert solid in use. The amounts of these components used may be set properly. Typically, the (a)-component is 0.001-0.5 mmol per 100 g of the monomer. Also, (b)-component/)a)-component is 5-100, and (c)-component/(a)-component is 0.5-10 as a molar ratio.

The polymerization temperature in the coordinate polymerization is preferably a range of −80 to 150° C., more preferably a rage of −20 to 120° C. As a solvent used in the coordinate polymerization may be used a hydrocarbon solvent inactive to the reaction as exemplified in the aforementioned anion polymerization. Also, the concentration of the monomer in the reaction solution is the same as in the anion polymerization. Further, the reaction pressure in the coordinate polymerization is the same as in the anion polymerization. The starting materials used in the reaction are desirable to be used by substantially removing reaction inhibiting substances such as water, oxygen, carbon dioxide, protonic compound and the like.

When the polymerization active site in the polymer having the polymerization active site is modified with a modifying agent, it is preferable to use a nitrogen-containing compound, a silicon-containing compound and a tin-containing compound as a modifying agent. in this case, a nitrogen-containing functional group, a silicon-containing functional group or a tin-containing functional group can be introduced by the modification reaction. Moreover, if the polymer having the polymerization active site already has at least one functional group through synthesis with an initiator having a functional group, the polymerization reaction may be stopped by adding a shortstop usually used in polymerization reaction to the reaction system.

The nitrogen-containing compound usable as the modifying agent is preferable to have substituted or non-substituted amino group, amido group, imino group, imidazole group, nitrile group or pyridyl group. As the nitrogen-containing compound preferable as a modifying agent are mentioned isocyanate compounds such as diphenylmethane diisocyanate, crude MDI, trimethylhexamethylene diisocyanate, tolylene diisocyanate and the like; 4,4'-bis(diethylamino) benzophenone, 4-(dimethylamino)benzophenone, 4-(diethylamino)benzophenone, 4-dimethylaminobenzylidene aniline, 4-dimethylaminobenzylidene butylamine, dimethylimidazolydinone, N-methyl pyrrolidone, 1-butylaziridine and so on.

As the silicon-containing compound usable as a modifying agent are mentioned 3-glycidoxypropyl trimethoxysilane, 3-glycidoxypropyl triethoxysilane, N-(1-methylpropylidene)-3-(triethoxysilyl)-1-propaneamine, N-(1,3-dimethylbutylidene)-3-(triethoxysilyl)-1-propaneamine, N-(3-triethoxysilylpropyl)-4,5-dihydroimidazole, 3-methacryloyloxypropyl trimethoxysilane, 3-icocyanatopropyl triethoxysilane, 3-triethoxysilylpropyl succinic acid anhydride, 3-(1-hexamethyleneimino)propyl(triethoxy)silane, (1-hexamethyleneimino)methyl(trimethoxy)silane, 3-diethylaminopropyl(triethoxy)silane, 3-dimethylaminopropyl(triethoxy)silane, 2-(trimethoxysilylethyl)pyridine, 2-(triethoxysilylethyl)pyridine, 2-cycnoethyltriethoxysilane, tetraethoxysilane and so on. These silicon-containing compounds may be used alone or in a combination of two or more. Also, a partial condensate of the silicon-containing compound may be used.

As the modifying agent is also preferable a coupling agent represented by the following formula (I):

$$R^1_a ZX_b \qquad (I)$$

(wherein $R^1$ is independently selected from the group consisting of an alkyl group having a carbon number of 1-20, a cycloalkyl group having a carbon number of 3-20, an aryl group having a carbon number of 6-20 and an aralkyl group having a carbon number of 7-20, and Z is tin or silicon, and X is independently chlorine or bromine, and a is 0-3, and b is 1-4, provided that a+b=4). By modifying with the coupling agent of the formula (I) can be improved a resistance to cold flow of the modified synthetic rubber. Moreover, the modified synthetic rubber obtained by modifying with the coupling agent of the formula (I) has at least one tin-carbon bond or silicon-carbon bond.

As $R^1$ of the formula (I) are concretely mentioned methyl group, ethyl group, n-butyl group, neophyl group, cyclohexyl group, n-octyl group, 2-ethylhexyl group and the like. As the coupling agent of the formula (I) are concretely preferable $SnCl_4$, $R^1 SnCl_3$, $R^1_2 SnCl_2$, $R^1_3 SnCl$, $SiCl_4$, $R^1 SiCl_3$, $R^1_2 SiCl_2$, $R^1_3 SiCl$ and so on, and particularly $SnCl_4$ and $SiCl_4$ are preferable.

The modification reaction of the polymerization active site with the above modifying agent is preferable to be carried out by a solution reaction. Also, the monomer used in the polymerization may be included in the solution. The system of the modification reaction is not particularly limited, and may be batch or continuous. Further, the reaction temperature of the modification reaction is not particularly limited as long as the reaction proceeds, and may adopt the reaction temperature of the polymerization reaction as it is. Moreover, the amount of the modifying agent used is preferably a range of 0.25-3.0 mol, more preferably a range of 0.5-1.5 mol per 1 mol of the initiator used in the production of the polymer.

in the rubber composition according to the invention, the rubber components constituting the non-compatible polymer blend is preferable to have a weight average molecular weight of not less than 200,000. When the weight average molecular weight of the rubber components is less than 200,000, the viscosity at uncured state is too low and a torque is not applied during the milling, and hence it is considered that the milling becomes insufficient.

The block copolymer used in the rubber composition according to the invention comprises a block-a consisting of the same monomer unit as the monomer unit forming the polymer phase A and a block-b consisting of the same monomer unit as the monomer unit forming the polymer phase B. Moreover, when each polymer phase is constituted with a rubber component made from two or more monomer units or with two or more rubber components, the corresponding block is also made from two or more monomer units. At this moment, the block-a in the block copolymer is made from the same monomer unit as the monomer unit forming the polymer phase A, so that it is compatible with the polymer phase A but is non-compatible with the polymer phase B. On the other hand, the block-b in the block copolymer is made from the same monomer unit as the monomer unit forming the polymer phase B, so that it is compatible with the polymer phase B but is non-compatible with the polymer phase A. That is, the block-a and block-b are non-compatible with each other, so that each block can be penetrated into only the corresponding polymer phase and hence the fracture properties and wear resistance can be improved.

Also, as described in JP-A-H11-29660, the crosslinking reaction between each block and each rubber component is made at approximately an equal velocity by adjusting the microstructure included in each block of the block copolymer, and hence the effect of improving the fracture properties and wear resistance can be considerably increased.

The block copolymer is not particularly limited but is preferably a conjugated diene based polymer, i.e. a polymer of a conjugated diene compound or a polymer of an aromatic vinyl compound and a conjugated diene compound. Also, the block copolymer can be obtained, for example, by a method wherein a conjugated diene compound as a monomer or a mixture of an aromatic vinyl compound and a conjugated diene compound as a monomer is polymerized with an initiator until a conversion of the monomer is at least 5 mass %, preferably not less than 10 mass % to produce a block-a, and then a conjugated diene compound as a monomer or a mixture of an aromatic vinyl compound and a conjugated diene compound as a monomer is added t further conduct polymerization to thereby produce a block-b. The block copolymer may be produced by an anion polymerization or by a coordinate polymerization. Also, the block copolymer may be either an unmodified polymer or a modified polymer. Furthermore, the form of the resulting modified polymer differs depending on the kind of the modifying agent, but is not particularly limited and may take any form of linear polymer, branched polymer, star-shaped polymer and the like. Moreover, the linear polymer is preferable among these forms of the modified polymer.

As the conjugated diene compound, aromatic vinyl compound and initiator used in the production of the block copolymer can be exemplified the same as the conjugated diene compound, aromatic vinyl compound and initiator usable for the modified synthetic rubber. Also, the anion polymerization, coordinate polymerization and modification reaction can be made in the same manner as described in the production method of the modified synthetic rubber.

In the block copolymer in the rubber composition according to the invention, the weight average molecular weight of each of the block-a and block-b is preferably 50,000-500,000. When the weight average molecular weight of the block-a or block-b is less than 50,000, the entanglement with the rubber component constituting the non-compatible polymer blend becomes difficult and the effect of improving the affinity at the polymer/polymer interface can not be ensured sufficiently, while when it exceeds 500,000, the synthesis of the block copolymer tends to become difficult. Also, the block-a and block-b forming the block copolymer are preferable to have approximately an equal weight average molecular weight from each other, but are not limited thereto. Moreover, the weight average molecular weight of each block means that polymers of block-a and block-b as a model are synthesized, respectively, to measure each weight average molecular weight of the resulting polymers.

In the rubber composition according to the invention, the amount of the block copolymer compounded is preferably 0.3-20 parts by mass, more preferably 0.3-9 parts by mass per 100 parts by mass in total of the rubber components constituting the non-compatible polymer blend. When the amount of the block copolymer compounded per 100 parts by mass in total of the rubber components is less than 0.3 part by mass, the effect of improving the affinity at the polymer/polymer interface is not obtained sufficiently, while when it exceeds 20 parts by mass, the properties of the rubber composition tend to be deteriorated.

The rubber composition according to the invention is preferable to further contain a filler in an amount of 10-100 parts by mass, more preferably 20-80 parts by mass per 100 parts by mass in total of the rubber components constituting the non-compatible polymer blend. When the amount of the filler per 100 parts by mass in total of the rubber components is less than 10 parts by mass, the fracture properties and wear resistance of the vulcanized rubber are not sufficient, while when it exceeds 100 parts by mass, the workability tends to be deteriorated. As the filler are preferable carbon black and silica. As the carbon black, FEF, SRF, HAF, ISAF and SAF grades are preferable, and HAF, ISAF and SAF grades are further preferable. As the silica, wet silica and dry silica are preferable, and wet silica is further preferable. These reinforcing fillers may be used alone or in a combination of two or more.

The rubber composition according to the invention can be produced by compounding the above rubber components with the block copolymer and the filler, and additives usually used in the rubber industry and properly selected without damaging the object of the invention such as silane coupling agent, softening agent, stearic acid, antioxidant, zinc oxide, vulcanization accelerator, vulcanizing agent and the like, and then milling warming and extruding them.

The tire according to the invention is characterized by using the aforementioned rubber composition in a tread portion. In the tread portion of the tire is used the rubber composition which suppresses the strain concentrated in the interface between filler and polymer and effectively develops the effect of improving the affinity at the polymer/polymer interface, so that the fracture properties such as tensile strength (Tb), elongation at break (Eb) and the like and the wear resistance are considerably improved. Moreover, the tire according to the invention is not particularly limited except that the aforementioned rubber composition is used in the tread portion, and can be manufactured according to the usual manner. As a gas to be filled in the tire can be used normal air or air having a regulated oxygen partial pressure as well as an inert gas such as nitrogen, argon, helium or the like.

EXAMPLES

The following examples are given in illustration of the invention and are not intended as limitations thereof.

Production Example 1 of Rubber Component

Unmodified HCBR

A catalyst A is obtained by reacting and maturing a solution of neodymium versatate (0.09 mmol) in cyclohexane, a solution of methylaluminoxane (MAO: PMAO made by Toso Aquzo Co., Ltd.) (1.8 mmol) in toluene, a solution of hydrogenated diisobutylaluminum (DIBAH: made by Kanto Chemical Co., Ltd.) (5.0 mmol) and diethylaluminum chloride (0.18 mmol) in toluene, and 1,3-butadiene (4.5 mmol) as a catalyst component at 50° C. for 30 minutes. Then, 2.4 kg of cyclohexane and 300 g of 1,3-butadiene are charged into an autoclave of 5 liters purged with nitrogen under a nitrogen atmosphere and the catalyst A is further added to the resulting solution to conduct polymerization at 80° C. for 60 minutes. In this case, the conversion of 1,3-butadiene is approximately 100%. Subsequently, a solution of 1.5 g of 2,4-di-tert-butyl-p-cresol in methanol is added to the polymerization system to stop polymerization, and further dried according to the usual manner to obtain a polymer A (unmodified HCBR: weight average molecular weight (Mw)=300,000, content of cis-1,4 bond=97%).

Production Example 2 of Rubber Component

Modified HCBR

Into an autoclave of 5 liters purged with nitrogen are charged 2.4 kg of cyclohexane and 300 g of 1,3-butadiene under a nitrogen atmosphere, and further the catalyst A is added to the resulting solution to conduct polymerization at 80° C. for 60 minutes. In this case, the conversion of 1,3-butadiene is approximately 100%. Then, 4,4-bis(diethylamino)benzophenone (0.55 mmol) is added as a modifying agent to the polymerization system to conduct modification reaction for 30 minutes. Subsequently, a solution of 1.5 g of 2,4-di-tert-butyl-p-cresol in methanol is added to the polymerization system to stop polymerization, and further dried according to the usual manner to obtain a polymer B (modified HCBR: weight average molecular weight (Mw)=300,000, content of cis-1,4 bond=97%).

Production Example 3 of Rubber Component

Modified HCBR

Into an autoclave of 5 liters purged with nitrogen are charged 2.4 kg of cyclohexane and 300 g of 1,3-butadiene under a nitrogen atmosphere, and further the catalyst A is added to the resulting solution to conduct polymerization at 80° C. for 60 minutes. In this case, the conversion of 1,3-butadiene is approximately 100%. Then, 1-butylaziridine (0.55 mmol) is added as a modifying agent to the polymerization system to conduct modification reaction for 30 minutes. Subsequently, a solution of 1.5 g of 2,4-di-tert-butyl-p-cresol in methanol is added to the polymerization system to stop polymerization, and further dried according to the usual manner to obtain a polymer C (modified HCBR: weight average molecular weight (Mw)=300,000, content of cis-1,4 bond=96%).

Production Example 4 of Rubber Component

Unmodified LCBR

Into a pressure glass vessel of a capacity of about 900 ml dried and purged with nitrogen are charged 283 g of cyclohexane, 100 g of 1,3-butadiene and a solution of 0.015 mmol of 2,2-ditetrahydrofuryl propane in cyclohexane, and further 0.50 mmol of n-butyllithium (n-BuLi) is added and then polymerization reaction is carried out in a warm bath of 50° C. provided with a stirring device for 4.5 hours. In this case, the conversion of 1,3-butadiene is approximately 100%. Subsequently, 0.5 mL of a solution of 2,6-di-t-butyl-p-cresol (BHT) in isopropanol (BHT concentration: 5 mass %) is added to the polymerization system to stop polymerization reaction, and further dried according to the usual manner to obtain a polymer D (unmodified LCBR: weight average molecular weight (Mw)=300,000, content of cis-1,4 bond=32%).

Production Example 5 of Rubber Component

Modified LCBR

Into a pressure glass vessel of a capacity of about 900 ml dried and purged with nitrogen are charged 283 g of cyclohexane, 100 g of 1,3-butadiene and a solution of 0.015 mmol of 2,2-ditetrahydrofuryl propane in cyclohexane, and further 0.50 mmol of n-butyllithium (n-BuLi) is added and then polymerization reaction is carried out in a warm bath of 50° C. provided with a stirring device for 4.5 hours. In this case, the conversion of 1,3-butadiene is approximately 100%. Then, a solution of tin tetrachloride (0.50 mmol) in cyclohexane as a modifying agent is added to the polymerization system to further conduct modification reaction at 50° C. for 30 minutes with stirring. Subsequently, 0.5 mL of a solution of 2,6-di-t-butyl-p-cresol (BHT) in isopropanol (BHT concentration: 5 mass %) is added to the polymerization system to stop polymerization reaction, and further dried according to the usual manner to obtain a polymer E (modified LCBR: weight average molecular weight (Mw)=300,000, content of cis-1,4 bond=31%).

Production Example 6 of Block Copolymer

HC Block

Into an autoclave of 5 liters purged with nitrogen are charged 2.4 kg of cyclohexane and 100 g of 1,3-butadiene (component of block-a), and further the catalyst A is added to the resulting solution to conduct polymerization at 80° C. for 60 minutes. In this case, the conversion of 1,3-butadiene is approximately 100%. Then, a cyclohexane solution containing 100 g of isoprene (component of block-b) is added to the polymerization system to further conduct polymerization for 60 minutes. Subsequently, a solution of 1.5 g of 2,4-di-tert-butyl-p-cresol in methanol is added to the polymerization system to stop polymerization reaction, and further dried according to the usual manner to obtain a polymer F (HC block: weight average molecular weight (Mw) of block-a=100,000, weight average molecular weight (Mw) of block-b=100,000, content of cis-1,4 bond=96%). Moreover, HC blocks having different weight average molecular weights of block-a and block-b are synthesized by changing the amounts of 1,3-butadiene and isoprene used (see Table 3).

Production Example 7 of Block Copolymer

LC Block

Into a pressure glass vessel of a capacity of about 900 ml dried and purged with nitrogen are charged 283 g of cyclohexane, 35 g of 1,3-butadiene (component of block-a) and a solution of 0.015 mmol of 2,2-ditetrahydrofuryl propane in cyclohexane, and further 0.50 mmol of n-butyllithium (n-BuLi) is added to conduct polymerization in a warm bath of 50° C. provided with a stirring device for 1.5 hours. In this case, the conversion of 1,3-butadiene is approximately 100%. Then, a cyclohexane solution containing 35 g of isoprene (component of block-b) is added to the polymerization system to further conduct polymerization for 1.5 hours. Subsequently, 0.5 mL of a solution of 2,6-di-t-butyl-p-cresol (BHT) in isopropanol (BHT concentration: 5 mass %) is added to the polymerization system to stop polymerization reaction, and further dried according to the usual manner to obtain a polymer G (LC block: weight average molecular weight (Mw) of block-a=$100 \times 10^3$, weight average molecular weight (Mw) of block-b=$100 \times 10^3$, content of cis-1,4 bond=30%).

Moreover, the weight average molecular weight (Mw) and microstructure of the polymers produced as mentioned above are measured by the following methods.

(1) Weigh Average Molecular Weight (Mw)

A weight average molecular weight (Mw) of each polymer as converted to polystyrene at a state without modification stop is measured by a gel permeation chromatography [GPC: HLC-8020 made by Toso Co., Ltd. column: GMH-XL made by Toso Co., Ltd. (two columns in series), detector: differential refractometer (RI)] with a monodisperse polystyrene as a standard substance. As to the block copolymer, the weight average molecular weight (Mw) of each block in the block copolymer is measured.

(2) Microstructure

The microstructure of the polymer is measured by an infrared method (Morello's method).

<Evaluation on Properties of Rubber Composition>

Then, a rubber composition having a compounding recipe shown in Table 1 is prepared and further the rubber composition is vulcanized at 160° C. for 15 minutes to obtain a vulcanized rubber, to which are measured and evaluated tensile strength (Tb), elongation at break (Eb), tan δ and wear resistance. The results are shown in Tables 2-4.

(3) Tensile Strength

The tensile strength (Tb) is measured according to JIS K6251-1993 and represented by an index on the basis that the tensile strength in Comparative Example 1 of Table 2 is 100 and the tensile strength in Example 6 of Table 3 is 100 and the tensile strength in Comparative Example 5 of Table 4 is 100. The larger the index value, the better the fracture properties.

(4) Elongation at Break

The elongation at break (Eb) is measured according to JIS K6251-1993 and represented by an index on the basis that the elongation at break in Comparative Example 1 of Table 2 is 100 and the elongation at break in Example 6 of Table 3 is 100 and the elongation at break in Comparative Example 5 of Table 4 is 100. The larger the index value, the better the fracture resistance.

(5) tan δ

The loss tangent (tan δ) is measured at a temperature of 50° C., a strain of 5% and a frequency of 15 Hz using a viscoelasticity measuring apparatus and represented by an index on the basis that tan δ in Comparative Example 1 of Table 2 is 100 and tan δ in Example 6 of Table 3 is 100 and tan δ in Comparative Example 5 of Table 4 is 100. The larger the index value, the lower the loss factor.

(6) Wear Resistance

The worn amount is measured at room temperature and a slippage ratio of 60% using a Lambourn abrasion testing machine and represented by an index on the basis that a reciprocate of the worn amount in Comparative. Example 1 of Table 2 is 100 and a reciprocate of the worn amount in Example 6 of Table 3 is 100 and a reciprocate of the worn amount in Comparative Example 5 of Table 4 is 100. The larger the index value, the smaller the worn amount and the better the wear resistance.

TABLE 1

|   |   | Amount compounded (part by mass) |
|---|---|---|
| rubber component (A) | natural rubber *1 | 50 |
|   | polybutadiene rubber *2 | 50 |
| block copolymer *3 |   | X |
| carbon black |   | 45 |
| antioxidant 6C *4 |   | 1 |
| stearic acid |   | 2 |
| zinc oxide |   | 3 |
| vulcanization accelerator CZ *5 |   | 1.2 |
| sulfur |   | 1 |

*1 RSS#1, weight average molecular weight = 2,000,000
*2 polybutadiene rubber prepared in the aforementioned method, Kind of polybutadiene rubber used is shown in Tables 2-4. Moreover, any of polybutadienes show a non-compatibility with natural rubber and form non-compatible polymer blends.
*3 block copolymer prepared in the aforementioned method, Kind and amount of block copolymer used per 100 parts by mass in total of rubber components are shown in Tables 2-4.
*4 N-(1,3-dimethylbutyl)-N'-phenyl-p-phenylene diamine
*5 N-cyclohexyl-2-benzothiazolyl sulfenamide

TABLE 2

|   |   | Example 1 | Example 2 | Comparative Example 1 | Example 3 | Example 4 |
|---|---|---|---|---|---|---|
| natural rubber *6 | parts by | 50 | 50 | 50 | 50 | 50 |
| modified HCBR *7 | mass | 50 | 50 | 50 | 50 | 50 |
| HC block *8 |   | 7 | — | — | 3 | 15 |
| LC block *9 |   | — | 7 | — | — | — |
| weight average molecular weight of block-a (×10³) |   | 100 | 100 | — | 100 | 100 |
| weight average molecular weight of block-b (×10³) |   | 100 | 100 | — | 100 | 100 |
| tensile strength (index) |   | 110 | 105 | 100 | 105 | 112 |
| elongation at break (index) |   | 110 | 105 | 100 | 104 | 110 |
| tan δ (index) |   | 100 | 99 | 100 | 100 | 100 |
| wear resistance (index) |   | 111 | 106 | 100 | 104 | 105 |

*6 RSS#1, weight average molecular weight = 2,000,000
*7 modified HCBR prepared according to Production Example 2
*8 HC block prepared according to Production Example 6
*9 LC block prepared according to Production Example 7

As seen from Table 2, the rubber compositions of Examples 1-4 containing the modified polymer as at least one of the rubber components constituting the non-compatible polymer blend and further the block copolymer can considerably improve the fracture resistance and wear resistance as compared with the rubber composition of Comparative Example 1 having the same non-compatible polymer blend but containing no block copolymer.

TABLE 3

|   |   | Example 5 | Example 6 | Example 7 |
|---|---|---|---|---|
| natural rubber *10 | parts by | 50 | 50 | 50 |
| modified HCBR *11 | mass | 50 | 50 | 50 |
| HC block *12 |   | 7 | 7 | 7 |
| weight average molecular weight of block-a (×10³) |   | 100 | 20 | 20 |
| weight average molecular weight of block-b (×10³) |   | 100 | 100 | 800 |
| tensile strength (index) |   | 110 | 100 | 102 |
| elongation at break (index) |   | 105 | 100 | 98 |
| tan δ (index) |   | 96 | 100 | 98 |
| wear resistance (index) |   | 107 | 100 | 99 |

*10 RSS#1, weight average molecular weight = 2,000,000
*11 modified HCBR prepared according to Production Example 2
*12 HC block prepared according to Production Example 6

As seen from Table 3, if the scattering of the weight average molecular weights of the block-a and block-b in the block copolymer is observed, the effect of improving the fracture resistance and wear resistance is lowered.

TABLE 4

| | | Example 8 | Comparative Example 2 | Example 9 | Comparative Example 3 | Example 10 | Comparative Example 4 | Example 11 |
|---|---|---|---|---|---|---|---|---|
| natural rubber *13 | parts by mass | 50 | 50 | 50 | 50 | 50 | 50 | 50 |
| unmodified HCBR *14 | | — | — | — | 50 | — | — | — |
| modified HCBR *15 | | 50 | — | — | — | 50 | — | — |
| modified HCBR *16 | | — | — | — | — | — | — | — |
| unmodified LCBR *17 | | — | 50 | — | — | — | 5- | — |
| modified LCBR *18 | | — | — | 50 | — | — | — | 50 |
| HC block *19 | | 7 | 7 | 7 | — | — | — | — |
| LC block *20 | | — | — | — | 7 | 7 | 7 | 7 |
| weight average molecular weight of block-a (×10³) | | 100 | 100 | 100 | 100 | 100 | 100 | 100 |
| weight average molecular weight of block-b (×10³) | | 100 | 100 | 100 | 100 | 100 | 100 | 100 |
| tensile strength (index) | | 110 | 98 | 108 | 105 | 105 | 97 | 105 |
| elongation at break (index) | | 108 | 104 | 110 | 102 | 104 | 102 | 105 |
| tan δ (index) | | 90 | 95 | 85 | 100 | 90 | 95 | 85 |
| wear resistance (index) | | 122 | 85 | 100 | 103 | 117 | 83 | 97 |

| | | Comparative Example 5 | Comparative Example 6 | Comparative Example 7 | Comparative Example 8 | Example 12 |
|---|---|---|---|---|---|---|
| natural rubber *13 | parts by mass | 50 | 50 | 50 | 50 | 50 |
| unmodified HCBR *14 | | 50 | — | — | — | — |
| modified HCBR *15 | | — | 50 | — | — | — |
| modified HCBR *16 | | — | — | — | — | 50 |
| unmodified LCBR *17 | | — | — | 50 | — | — |
| modified LCBR *18 | | — | — | — | 50 | — |
| HC block *19 | | — | — | — | — | 7 |
| LC block *20 | | — | — | — | — | — |
| weight average molecular weight of block-a (×10³) | | — | — | — | — | 100 |
| weight average molecular weight of block-b (×10³) | | — | — | — | — | 100 |
| tensile strength (index) | | 100 | 98 | 95 | 98 | 109 |
| elongation at break (index) | | 100 | 105 | 102 | 107 | 111 |
| tan δ (index) | | 100 | 90 | 95 | 85 | 87 |
| wear resistance (index) | | 100 | 110 | 80 | 90 | 123 |

*13 RSS#1, weight average molecular weight = 2,000,000
*14 unmodified HCBR prepared according to Production Example 1
*15 modified HCBR prepared according to Production Example 2
*16 modified HCBR prepared according to Production Example 3
*17 unmodified LCBR prepared according to Production Example 4
*18 modified LCBR prepared according to Production Example 5
*19 HC block prepared according to Production Example 6
*20 LC block prepared according to Production Example 7

From the comparison among Comparative Example 2, Example 9, Comparative Example 7 and Comparative Example 8 in Table 4, it can be seen that the effect obtained by using the modified polymer as at least one of the rubber components constituting the non-compatible polymer blend and further compounding the block copolymer (Example 9) considerably exceeds the sum of the effect obtained only by using the modified polymer as at least one of the rubber components constituting the non-compatible polymer blend (Comparative Example 8) and the effect obtained only by compounding the block copolymer (Comparative Example 2). Also, the similar results are obtained from the comparison among Comparative Example 3, Example 10, Comparative Example 5 and Comparative Example 6, and the comparison among Comparative Example 4, Example 11, Comparative Example 7 and Comparative Example 8.

The invention claimed is:

1. A rubber composition formed by compounding a non-compatible polymer blend, which comprises at least two rubber components and forms a polymer phase A and a polymer phase B, with a block copolymer comprising a block-a composed of the same monomer unit as a monomer unit forming the polymer phase A and a block-b composed of the same monomer unit as a monomer unit forming the polymer phase B, wherein at least one of the rubber components has at least one functional group selected from the group consisting of a silicon-containing functional group, a tin-containing functional group, an imidazole group, a pyridyl group, an amino group, an imino group, an ammonium group, an imide group, a hydrazo group, an azo group, a diazo group, a hydroxyl group, an epoxy group, an oxycarbonyl group, a sulfide group, a disulfide group, a sulfonyl group, a sulfinyl group, a thiocarbonyl group, a nitrogen-containing heterocyclic group, an oxygen-containing heterocyclic group, and an alkoxysilyl group.

2. A rubber composition according to claim 1, wherein one of the polymer phase A and polymer phase B comprises natural rubber and/or polyisoprene rubber, and the other polymer phase comprises a synthetic rubber other than polyisoprene rubber.

3. A rubber composition according to claim 1, wherein the rubber component has a weight average molecular weight of not less than 200,000 and each of the block-a and block-b constituting the block copolymer has a weight average molecular weight of 50,000-500,000.

4. A rubber composition according to claim 2, wherein the synthetic rubber other than polyisoprene rubber is polybutadiene rubber.

5. A rubber composition according to claim 1, wherein an amount of the block copolymer compounded is 0.3-20 parts by mass per 100 parts by mass in total of the rubber components.

6. A rubber composition according to claim 1, wherein a filler is further included in an amount of 10-100 parts by mass per 100 parts by mass in total of the rubber components.

7. A tire characterized by using a rubber composition as claimed in claim 1 in any tire member.

8. A tire according to claim 7, wherein the tire member is a tread portion, a sidewall portion, a side reinforcing rubber, a bead portion or a rubber chafer.

* * * * *